United States Patent
Nichols (10) Patent No.: US 9,574,343 B2
(45) Date of Patent: *Feb. 21, 2017

(54) METHOD OF PROTECTING BUILDINGS FROM TERMITE ATTACK

(71) Applicant: Prestige Air-Technology Limited, Ashford (GB)

(72) Inventor: Paul Ian Nichols, Constantine (GB)

(73) Assignee: Prestige Air-Technology Limited (GB)

( * ) Notice: Subject to any disclaimer, the term of this patent is extended or adjusted under 35 U.S.C. 154(b) by 565 days.

This patent is subject to a terminal disclaimer.

(21) Appl. No.: 13/870,858

(22) Filed: Apr. 25, 2013

(65) Prior Publication Data

US 2013/0305589 A1 Nov. 21, 2013

Related U.S. Application Data

(63) Continuation-in-part of application No. 13/420,765, filed on Mar. 15, 2012, now Pat. No. 9,226,491, and a (Continued)

(51) Int. Cl.
*A01M 17/00* (2006.01)
*A01M 13/00* (2006.01)
(Continued)

(52) U.S. Cl.
CPC ........ *E04B 1/72* (2013.01); *A01M 1/24* (2013.01); *A01M 1/245* (2013.01); *A01M 13/00* (2013.01);
(Continued)

(58) Field of Classification Search
CPC ............ A01M 1/20; A01M 1/00; A01M 1/24; A01M 1/245; A01M 13/00; A01M 17/00; A01M 17/02; A01M 17/04; A01M 29/00; A01M 29/34; A01M 29/30
(Continued)

(56) References Cited

U.S. PATENT DOCUMENTS

| | | | | |
|---|---|---|---|---|
| 2,257,541 | A | * 9/1941 | Smith | A23L 3/266 422/22 |
| 3,117,832 | A | * 1/1964 | Thomas | A61L 2/20 422/23 |

(Continued)

FOREIGN PATENT DOCUMENTS

| | | |
|---|---|---|
| AU | 74032-74 | 8/1976 |
| EP | 1570734 | 9/2005 |

(Continued)

*Primary Examiner* — Darren W Ark
(74) *Attorney, Agent, or Firm* — Fellers, Snider, Blankenship, Bailey & Tippens, P.C.

(57) ABSTRACT

The present invention relates to a method for protecting the lower regions of and structure of a building (10) from damage or degradation by termites. The method comprises the steps of creating a region in the ground below the building having properties hostile to termites whereby to discourage them from approaching the vicinity of the building. In one embodiment means for creating a hostile region in the ground below the building are provided by a pump (12) which creates a superatmoshpheric pressure field (40) in this region. Treatment agents (31) such as ozone may be delivered to the ground region in order to provide a hostile effect to the termites by affecting their pheromone chemistry and/or their reproductive or communicative behavior. A secondary function of the present invention relates to the creation of a forced ventilation (46) of the habitable region (18) within which the apparatus of the present invention resides.

26 Claims, 7 Drawing Sheets

Related U.S. Application Data continuation-in-part of application No. 12/094,517, filed as application No. PCT/GB2006/004309 on Nov. 17, 2006, now abandoned.

(51) Int. Cl.
| | | |
|---|---|---|
| *A01M 1/20* | (2006.01) | |
| *E04B 1/72* | (2006.01) | |
| *A01M 1/24* | (2006.01) | |
| *A01M 29/12* | (2011.01) | |
| *F24F 3/16* | (2006.01) | |
| *F24F 11/00* | (2006.01) | |

(52) U.S. Cl.
CPC ........... *A01M 17/00* (2013.01); *A01M 17/002* (2013.01); *A01M 29/12* (2013.01); *F24F 2003/1685* (2013.01); *F24F 2011/0004* (2013.01)

(58) Field of Classification Search
USPC ........................................ 43/132.1, 124, 125
See application file for complete search history.

(56) References Cited

U.S. PATENT DOCUMENTS

| | | | | |
|---|---|---|---|---|
| 3,294,480 | A * | 12/1966 | Potapenko | F24F 3/16 422/120 |
| 3,322,623 | A * | 5/1967 | Doakley | C02F 1/50 43/132.1 |
| 4,095,115 | A * | 6/1978 | Orr, Jr. et al. | C01B 13/11 204/176 |
| 4,182,663 | A * | 1/1980 | Vaseen | C01B 13/10 204/157.3 |
| 4,625,474 | A * | 12/1986 | Peacock | A01M 1/245 137/357 |
| 4,805,341 | A * | 2/1989 | Maeda | A01M 1/14 239/3 |
| 4,822,563 | A * | 4/1989 | Joslyn | A61L 2/20 422/31 |
| 5,050,338 | A * | 9/1991 | Doakley | A01M 1/245 43/132.1 |
| 5,349,778 | A * | 9/1994 | Chu | A01M 1/2094 43/124 |
| 5,378,086 | A * | 1/1995 | Campbell, Jr. | A01M 1/245 405/131 |
| 5,514,345 | A * | 5/1996 | Garbutt | A23B 7/144 422/124 |
| 5,566,627 | A * | 10/1996 | Pryor | A01B 17/00 111/118 |
| 5,575,105 | A * | 11/1996 | Otomo | A01M 1/026 340/573.2 |
| 5,592,774 | A * | 1/1997 | Galyon | A01M 1/026 43/124 |
| 5,624,635 | A * | 4/1997 | Pryor | A01B 17/00 422/28 |
| 5,788,930 | A * | 8/1998 | McMurray | A61L 2/28 422/105 |
| 5,815,090 | A * | 9/1998 | Su | A01M 1/026 340/573.2 |
| 5,877,422 | A * | 3/1999 | Otomo | A01M 1/026 340/573.2 |
| 5,915,949 | A * | 6/1999 | Johnson | A01M 1/02 43/124 |
| 5,983,834 | A * | 11/1999 | Tai | A01K 1/0047 119/448 |
| 6,052,066 | A * | 4/2000 | Su | A01M 1/026 340/573.1 |
| 6,150,944 | A * | 11/2000 | Martin | A01M 1/026 340/573.1 |
| 6,223,464 | B1 * | 5/2001 | Nekomoto | A01M 1/223 43/112 |
| 6,276,304 | B1 * | 8/2001 | Tai | A01K 1/0047 119/448 |
| 6,325,971 | B1 * | 12/2001 | Hayes | A01K 1/0047 119/437 |
| 6,327,812 | B1 * | 12/2001 | Hedman | A01M 1/2094 43/124 |
| 6,349,888 | B1 * | 2/2002 | Au | A01M 1/245 239/207 |
| 6,468,433 | B1 * | 10/2002 | Tribelski | A01M 1/226 205/435 |
| 6,581,324 | B1 * | 6/2003 | Creeger | A01M 1/00 43/131 |
| 6,596,232 | B1 * | 7/2003 | Lin | A61L 2/183 134/1 |
| 6,713,027 | B2 * | 3/2004 | McNulty, Jr. | A61L 2/202 422/186.06 |
| 6,810,832 | B2 * | 11/2004 | Ford | A01K 1/00 119/436 |
| 6,892,491 | B2 * | 5/2005 | Hedman | A01M 1/2094 43/124 |
| 6,893,610 | B1 * | 5/2005 | Barnes | A61L 9/20 422/121 |
| 6,955,786 | B2 * | 10/2005 | Carman | A23L 3/3409 422/186.07 |
| 7,036,269 | B1 * | 5/2006 | Chen | A01M 1/08 43/113 |
| 7,146,659 | B2 * | 12/2006 | Mattson, Jr. | A61H 33/6063 210/109 |
| 7,451,568 | B2 * | 11/2008 | Hoshall | A01M 1/026 43/124 |
| 7,468,159 | B2 * | 12/2008 | Lin | A61L 2/14 422/300 |
| 7,690,148 | B2 * | 4/2010 | Hedman | A01M 1/2094 43/132.1 |
| 7,837,932 | B2 * | 11/2010 | Hedman | A01M 1/2094 422/22 |
| 8,620,478 | B2 * | 12/2013 | Nichols | A01M 1/24 239/337 |
| 9,226,491 | B2 * | 1/2016 | Nichols | A01M 1/24 |
| 2001/0004813 | A1 * | 6/2001 | Hedman | A01M 1/2094 43/132.1 |
| 2002/0066223 | A1 * | 6/2002 | Hedman | A01M 1/2094 43/124 |
| 2003/0152481 | A1 * | 8/2003 | Birnecker | A61L 2/18 422/28 |
| 2003/0160699 | A1 * | 8/2003 | Trompen | A01M 1/026 340/573.2 |
| 2003/0192230 | A1 * | 10/2003 | Hoshall | A01M 1/245 43/124 |
| 2004/0028554 | A1 * | 2/2004 | Hedman | A61L 2/06 422/24 |
| 2004/0028583 | A1 * | 2/2004 | Hedman | A61L 2/06 422/292 |
| 2004/0067178 | A1 * | 4/2004 | Molleker | A01M 1/245 422/186.07 |
| 2004/0103579 | A1 * | 6/2004 | Nolen | A01M 1/023 43/107 |
| 2005/0013727 | A1 * | 1/2005 | Hedman | A01M 1/2094 422/3 |
| 2005/0220662 | A1 * | 10/2005 | Hedman | A01M 1/2094 422/1 |
| 2005/0246942 | A1 * | 11/2005 | Mueller | A01M 1/2094 43/124 |
| 2006/0017577 | A1 * | 1/2006 | Broussard | A01M 1/026 340/573.2 |
| 2006/0042155 | A1 * | 3/2006 | Nolen | A01M 1/023 43/112 |
| 2007/0084105 | A1 * | 4/2007 | Lindsay | A01M 1/2094 43/129 |
| 2008/0014111 | A1 | 1/2008 | Hedman | |
| 2008/0031770 | A1 * | 2/2008 | Heselton | A61L 2/202 422/4 |
| 2008/0274012 | A1 * | 11/2008 | Cumberland | A61L 2/10 422/4 |
| 2009/0117016 | A1 * | 5/2009 | Decker | A23L 3/3409 422/186.08 |
| 2009/0191091 | A1 * | 7/2009 | Danchenko | A23B 9/025 422/32 |

(56) References Cited

U.S. PATENT DOCUMENTS

| | | | | |
|---|---|---|---|---|
| 2009/0311134 | A1* | 12/2009 | Iwashita | A01N 37/16 422/28 |
| 2010/0024280 | A1* | 2/2010 | Reed | A01M 1/245 43/132.1 |
| 2010/0047116 | A1* | 2/2010 | Garner | A61L 2/10 422/4 |
| 2010/0298981 | A1* | 11/2010 | Chamorro | H01R 13/6456 700/276 |
| 2011/0008264 | A1* | 1/2011 | Negishi | A01M 13/006 424/40 |
| 2013/0164385 | A1* | 6/2013 | Shannon | A61L 2/202 424/616 |
| 2013/0276357 | A1* | 10/2013 | Shannon | A01M 13/00 43/132.1 |
| 2013/0305589 | A1* | 11/2013 | Nichols | A01M 1/24 43/125 |

FOREIGN PATENT DOCUMENTS

| | | | | |
|---|---|---|---|---|
| FR | 2852201 | | 9/2004 | |
| GB | 834004 | | 5/1960 | |
| GB | 2373004 | | 9/2002 | |
| GB | 2432375 | | 5/2007 | |
| GB | 2432375 A | * | 5/2007 | ............ A01M 1/026 |
| GB | 2454941 | | 5/2009 | |
| JP | 01091732 | | 4/1989 | |
| JP | 01091732 A | * | 4/1989 | |
| JP | 01304838 | | 12/1989 | |
| JP | 01304838 A | * | 12/1989 | |
| JP | 05170610 | | 7/1993 | |
| JP | 05170610 A | * | 7/1993 | |
| JP | 06327390 | | 11/1994 | |
| JP | 06327390 A | * | 11/1994 | |
| JP | 07008148 | | 1/1995 | |
| JP | 07008148 A | * | 1/1995 | |
| JP | 07059497 | | 3/1995 | |
| JP | 07059497 A | * | 3/1995 | |
| JP | 07213591 | | 8/1995 | |
| JP | 07213591 A | * | 8/1995 | |
| JP | 10070949 | | 3/1998 | |
| JP | 10070949 A | * | 3/1998 | |
| JP | 11036470 | | 2/1999 | |
| JP | 11036470 A | * | 2/1999 | |
| JP | 3071411 | | 9/2000 | |
| JP | 2001045957 A | * | 2/2001 | |
| JP | 20010145957 | | 2/2001 | |
| JP | 2001258455 | | 9/2001 | |
| JP | 2001258455 A | * | 9/2001 | |
| JP | 2001309744 | | 11/2001 | |
| JP | 2001309744 A | * | 11/2001 | |
| JP | 2002058411 | | 2/2002 | |
| JP | 2002058411 A | * | 2/2002 | |
| JP | 2002300840 | | 10/2002 | |
| JP | 2002300840 A | * | 10/2002 | |
| JP | 2003010732 | | 1/2003 | |
| JP | 2003010732 A | * | 1/2003 | |
| JP | 2004132020 | | 4/2004 | |
| JP | 2005176641 | | 7/2005 | |
| JP | 2005176641 A | * | 7/2005 | |
| JP | 2005221131 | | 8/2005 | |
| JP | 2005221131 A | * | 8/2005 | |
| JP | 2006055006 | | 3/2006 | |
| JP | 2006055006 A | * | 3/2006 | |
| JP | 2006304638 | | 11/2006 | |
| JP | 2006304638 A | * | 11/2006 | |
| WO | WO2005046743 | | 5/2005 | |
| WO | WO 2005046743 A1 | * | 5/2005 | ............ A01M 1/226 |

* cited by examiner

METHOD OF PROTECTING BUILDINGS FROM TERMITE ATTACK

CROSS REFERENCE TO RELATED APPLICATIONS

This application is a Continuation-in-Part of U.S. patent application Ser. No. 13/420,765 entitled "A METHOD OF PROTECTING BUILDINGS FROM TERMITE ATTACK", filed Mar. 15, 2012, which in turn is a Continuation-in-Part of U.S. patent application Ser. No. 12/094,517 entitled "IMPROVED BUILDING PROTECTION APPARATUS", filed May 21, 2008, which is a US National Entry of International Patent Application No. PCT/GB2006/004309, the contents of each of which are hereby incorporated by reference.

FIELD OF THE INVENTION

The present invention relates generally to a method for protecting the structure of a building from attack by termites.

BACKGROUND OF THE INVENTION

Existing pest control methods differ for new build and retrofit installations. For example, currently, in new build installations control is achieved by use of a passive barrier. Conversely, in retrofit installations the common control method involves the use of chemical treatment. Failure of performance may occur in both of these common methods currently used.

In the case of a passive barrier, for example of the type disclosed in U.S. Pat. No. 5,417,017, even a very small failure can effectively have the same result as having no barrier at all, since termites are able to pass through very small openings. Consequently, 100% performance of a control method of this type is difficult to achieve for a new build housing installation. An additional problem with this method of pest control is that damage to the barrier may occur during work being undertaken subsequent to the initial installation, such that later alterations may damage the integrity of an existing well-fitted barrier.

The treatment of existing buildings when infested with termites generally relies upon the delivery of a fumigating chemical and/or pesticide to the total area of the underside of a building, where access is difficult, with the intention of eradicating the pests by killing them. For this purpose the fumigation period is usually short and the concentration of fumigating chemicals is high. Consequently the effectiveness of this fumigation method is reliant upon the operative's efficiency. It is unlikely that 100% of the termites will be killed on every such treatment, leaving some in place to continue damaging the building, which means that a further treatment may be required. This is a labor intensive as well as a costly procedure, and more importantly the building is gradually damaged more and more by the termites which are not killed off at each treatment as their population builds up again.

Various systems have been tried to keep termites at bay to protect buildings. Japanese publication document 11-036470 (Kagawa) describes a system in which a treatment agent (ozone) is delivered as a fumigation treatment in to an already-infested building with the intention of killing the insects in place in the building by applying a concentration of treatment agents sufficiently high for this purpose and for relatively short duration. While such serious and potentially harmful fumigation is taking place in the building it is wise, if not downright necessary, for the building to be evacuated of its human inhabitants. Kagawa describes a treatment effected by infusing ozone for something in the region of two hours until the termites are killed.

U.S. Pat. No. 6,327,812 (Hedman) also relates to a high strength fumigation treatment lasting for up to six hours. In such fumigation treatments it is not possible to allow human habitation to continue. Another Japanese patent 6-3273902 (Miwazawa) involves utilizing a detector to sense the migration of termites in order to trigger the infusion of the treatment agent sufficient to kill the termites. This treatment is applied once the termites are in the building, and the aim of the treatment is to kill the termites entirely, although as discussed above, it has to be recognized that such total eradication is rarely actually achieved in practice.

In other circumstances, addressing a different pest, it is known to utilize long term low level infusion of ozone, for example as described in U.S. Pat. No. 5,514,343 (Garbut), which keeps molds and bacteria at bay in animal housing. Similarly, U.S. Pat. No. 6,325,971 (Hayes) describes a system for distributing ozone throughout a poultry house, including the step of infusing a litter bed with ozone to kill bacteria. The ozone is maintained at exposure levels lethal to pathogens within the litter bed indefinitely. The Garbut document describes the use of ozone in enclosed spaces, primarily fruit storage rooms or animal housing, with ozone being used to lethal effect on bacteria, fungus and molds. The document also refers to the maintenance of a residual amount of ozone sufficient continuously to suppress the bacteria, fungus and molds whilst being safe for human exposure to allow workers to move in and out of the ozonated area without hazard.

U.S. Pat. No. 6,276,304 (Tai) refers to the introduction of ozone into the material within a manure pit beneath ground level constituting part of the interior of a pig raising house.

Although it is recognized in these documents that a low level of ozone may achieve the desired lethal effect on the target bacteria or mold whilst nevertheless being sufficiently low in concentration in the regions occupied by humans as to cause no damage to the humans, this system cannot be applied directly to the protection of buildings from termites as will be discussed in more detail below.

The performance of the delivery system therefore is the key to achieving effective control of termites. The inventor has found that the integrity of a building can be preserved over a long time period by in infusing the ground or the region below the floor slab of a building with a concentration of treatment agent which is sufficient to create a hostile environment without actually killing any termites. As a consequence the termites are unable to remain in the hostile environment and move away from it. Importantly, as they leave, they secrete a warning pheromone which acts as a deterrent to other termites, discouraging them from entering the protected region while it remains active. It is therefore not necessary to infuse the treatment agent into the protected region while their pheromone is active. Indeed, it has also been found that continuous, uninterrupted delivery of treatment agent such as ozone may even be counterproductive because it can mask the termites' own warning pheromone, and termites can get inured to the presence of the treatment agent and develop tactics to cope with its presence. One technique which has been observed is for termites to create tunnels from regurgitated cellulose obtained from wooden parts of the building's structure. The cellulose tunnels are impervious to ozone so that the termites are effectively screened from it and can consequently bore further into the timber weakening the structure despite the attempts to eradicate them. A prophylactic treatment thus requires a careful determination of the best concentration of treatment agent such as to cause the termites to vacate the protected region, rather than flooding the area and causing death without giving the insects an opportunity to escape since it is only upon escaping that they secrete their warning pheromone that is developed by the termites themselves. The pheromone adheres to the surfaces of their passageways and tunnels and warns other termites not to enter the protected region.

SUMMARY OF THE INVENTION

Accordingly, the present invention provides a method of protecting a building from damage by termites comprising the steps of:
  (a) preparing an introduction pathway for delivering ozone to a region below the building;
  (b) determining, from the physical parameters of the building:
    (i) the maximum safe delivery rate at which ozone can be delivered through the said introduction pathway while maintaining the concentration of ozone below a safety threshold level in the habitable parts of the building such as to allow continuous uninterrupted occupation by humans;
    (ii) the infusion duration period for which infusion at the said maximum delivery rate will achieve a substantially complete saturation of the said region for a time sufficient to affect the behavior of any termites present in the said region;
    (iii) the deterrence period during which termites will be deterred from re-entry into the said region by residual pheromones secreted by departing termites; and
  (c) introducing ozone at a rate not greater than the said determined maximum safe delivery rate into the said introduction pathway for the said determined infusion duration period, thereafter discontinuing the introduction of ozone for a discontinuance period not less than the said determined deterrence period;
  (d) recommencing the introduction of ozone at a rate not greater than the said determined maximum safe delivery rate for a further said infusion duration period and
  (e) repeatedly cycling the periods of infusion and discontinuance.

The present invention also comprehends a method of protecting a building from damage by termites, comprising the steps of:
  (a) establishing the presence of termites or termite activity within the building or within the vicinity thereof,
  (b) preparing an introduction pathway for delivering ozone to a region below the building,
  (c) infusing the said region with ozone by delivering ozone through said introduction pathway into said region at a rate and at a concentration which is likely to result in an ozone concentration in the habitable parts of the building which is less than that at which its presence would cause harmful effects on humans occupying the said habitable parts of the building and sufficient to cause the termites to vacate the building,
  (d) continuing said ozone delivery for a period greater than that likely to result in substantially complete vacation of the building and the said region by termites,
  (e) thereafter discontinuing said ozone delivery for a time period greater than that likely to be taken by termites to reinfest said building, and
  (f) recommencing said delivery of ozone into said introduction pathway and repeating said infusion and discontinuance steps.

The infusion of ozone into the said region makes it inhospitable to the termites. Ozone is delivered at least in sufficient concentration to affect the reproductive or communicative behavior of said termites. In other words it is not sufficiently concentrated as to be lethal, but it causes termites to attempt to communicate by secreting warning pheromones as they leave the region.

The ozone is thus to be delivered at least in sufficient concentration to modify the pheromone chemistry of the termites.

In a further aspect, the present invention provides a method of protecting a building from damage, by termites, comprising the steps of:
  (a) detecting the presence of termites within the building or the close vicinity thereof;
  (b) infusing a protected region of the ground below the building with ozone by delivering ozone into the said protected region at a determined concentration which is both less than that at which its presence would cause detrimental effects on humans occupying the building, and sufficient to cause the termites to vacate the protected region,
  (c) discontinuing the delivery of ozone upon departure of the termites, thereafter maintaining the ozone delivery turned off and allowing termites to return to the protected region,
  (d) recommencing the delivery of ozone at the said determined concentration after the termites have returned to the protected region and continuing delivery until the termites again vacate the said protected region,
  (e) repeating the said detecting and infusing steps for as long as the termites return into the said protected region.

The present invention may also be considered as a method of protecting a building from damage by termites, comprising the steps of:
  (a) detecting the presence of termites within the building or within close proximity thereof;
  (b) infusing a protected region of ground below the building with ozone by delivering ozone into said protected region at a determined concentration which is less than that at which its presence would cause harmful effects on humans occupying the building and sufficient to cause the termites to vacate the protected region;
  (c) detecting the absence of termites in said protected region;
  (d) discontinuing the delivery of ozone to said protected region;
  (e) monitoring the protected region to detect the return of termites thereto, and determining the time elapsed since delivery of ozone was discontinued;
  (f) recommencing delivery of ozone at the said determined concentration until the termites again vacate the said protected region, and;
  (g) repeating the periodic delivery of ozone at intervals and for time periods determined by the said detection of the presence and absence of the termites.

In yet another aspect the present invention provides apparatus for protecting a building from damage by termites, comprising:
  means defining an introduction pathway to a region below the building;

ozone delivery means for delivering ozone into the said introduction pathway at a rate such as to maintain the concentration of ozone within the habitable parts of the building below a safe threshold level for uninterrupted human habitation; and control means for controlling the said ozone delivery means whereby periodically to deliver ozone for an infusion duration period and to discontinue delivery for a discontinuance period not less than a previously-determined or estimated deterrence period, the said control means acting to cycle the said ozone delivery means through repeated said infusion duration periods and discontinuance periods.

The apparatus used for performing the method of the invention may be used for generating a superatmospheric pressure field in the ground region below the building. A positive pressure field in this region will help to ensure that the termites are repelled from this field and therefore are discouraged from approaching the protected region.

The means for creating a superatmospheric pressure field may comprise a pump located within the building. Such a pump may provide sufficient pressure to create a superatmospheric pressure field in the region below the building.

The pump may be located within a habitable region of the building and may act to create forced ventilation thereof. By pumping air from the habitable region of the building to a region below the building, this creates a pressure differential between the two regions. The resultant sub-atmospheric pressure field created in the habitable region of the building encourages an inward movement of air from the exterior of the building thereby naturally ventilating the interior of the building. Further, because the pump is located within a habitable region of the building, access to the pump is made easier for the purpose of any repair and maintenance work that may be required.

Although not essential for the performance of the method of the invention the apparatus may further comprise detecting means for monitoring the movement of termites as they approach the building from within the ground region below the building. The detecting means may be capable of communication with the means for delivery of the treatment agent into the region below the building, to allow the treatment agent to be delivered when required in response to the arrival of the termites. In this way, the treatment agent can be delivered to the protected region below the building in such a way as to maximize its effectiveness and moreover to trigger the termites themselves to generate the pheromone which acts as a warning signal of long duration to keep other termites from approaching the building for a significant time period.

The apparatus may further comprise additional components to alter the form and/or potency of the treatment agent to be delivered. This may include, for example means for ionizing air, for generating ozone or for generating oxides of nitrogen. Accordingly, the apparatus comprising the aforementioned means may act to ionize the air which passes through the apparatus. Further, the aforementioned means may also act to generate ozone and/or generate oxides of nitrogen from the air that passes through the apparatus. The ozone may be generated on site (i.e. in situ) or may be generated off-site and stored in containers on site ready for delivery to the region below a building, whereby to produce an environment inhospitable to termites The method of the invention may further comprise the step of detecting the arrival or presence of termites below the building and in response using this information to initiate the delivery of the treatment agent. If the treatment agent is ozone the appropriate delivery rate to achieve the required concentration levels at the places where the termites are found can be determined in advance from tests conducted on the site, or may be conducted from tables drawn up as a result of previous tests on similar such buildings or under laboratory conditions so that when implementing the method of the invention further such tests are not required.

The delivery of the treatment agent to the region below the building may also effectively provide ventilation which may also prevent wood decay in the lower regions of the buildings simply by improving the ventilation. However, the creation of an airflow at depth flooding through the ground under a building will act to remove track scenting, laid by termites. It is important therefore, that the delivery of treatment agent be discontinued once the termites have vacated the protected region, in order to avoid dissipating their warning pheromones, which would result in an earlier re-infestation.

The delivery of ozone may be used as a backup insurance to a permanent passive barrier. The required amount of ozone delivered may of course change over time depending on the nature of the ground and possibly the species of termites and therefore the temporally spaced intervals of the treatment agent delivery may also be varied to accommodate this change.

The delivery of the ozone may also additionally be randomly altered in terms of the concentration or the length of the infusion and discontinuance intervals. In this way, the termites are less likely to become resistant or tolerant to the arrangement of the irregular delivery of treatment agent, whether this be the concentration or the temporal intervals between the treatment agent applications.

A pheromone is a volatile hormone or behavior-modifying agent. Ozone is a known, strongly oxidizing agent. Accordingly, it is believed that ozone may be used to modify the behavior of a termite, causing it to produce a pheromone, such that the communication between termites for example, is affected. This may, for example, have a disorientating effect on the termites.

Apparatus formed according to the present invention may comprise means for generating ozone in situ or on site, which may then be conveyed to the required regions. A method of producing ozone on site may include for example, reacting hydrocarbons with nitrogen oxides, particularly nitrogen dioxide, in the presence of sunlight or other source of ultra-violet light. This method is similar to the natural creation of ground level ozone. Other methods of generating ozone on site may include electrostatic or corona discharge techniques.

In use of an embodiment of the present invention air comprising ozone is injected into a region below a building infested with termites or other insects. The ozone has the effect of creating an uncomfortable and hostile environment for the termites or other insects, and further is able to modify the pheromone chemistry thereof, thereby inhibiting the communication between the termites or other insects, which has the effect of disorientating them. Accordingly, such termites or other insects may either be reduced in numbers by evacuation or termination, or may simply be discouraged from approaching the building.

Insects, such as termites, feed on wood or other sources of cellulose. Although they lack specific cellulases for breaking down cellulose they are still able to digest it because of symbiotic relationships with flagellate protozoa, bacteria and fungi. For example, some protozoa digest wood particles by hydrolyzing cellulose anaerobically, which produces glucose that can be absorbed by an insect, such as a termite.

The cellulose which insects, such as termites, attack is broken down to carbon dioxide and water, causing timber to lose strength. The resultant increase in concentration of carbon dioxide during digestion of wood by termites, for example, provides an attractant scent indicating the presence of food for other termites. It is thought that the presence of ozone may reduce or eliminate the carbon dioxide residing in the environment of the termite or other insects, thereby affecting the pheromone chemistry of the termites or other insects. The ozone may thus provide an energized oxygen-rich atmosphere inhospitable to termites or other insects.

To ensure that the ozone concentration does not have adverse effects on human health if the ozone were to escape from the region below the building into the building itself, the concentration of the ozone in the air to be injected is preferably less than 0.1 ppm (parts per million). If a building is already infested with termites, then it may be desirable to inject a higher ozone concentration (higher than 0.1 ppm) for a short period to begin with, to increase the potency of the ozone/air mix, then reduce to a lower ozone concentration (lower than 0.1 ppm), which may be pumped continuously for an extended period because it is below the safety threshold for humans. Alternatively, in houses under construction, it may be advantageous to inject a low ozone concentration (lower than 0.1 ppm) continuously during construction, for a preventative effect.

BRIEF DESCRIPTION OF THE DRAWINGS

Various embodiments of the present invention will now be more particularly described, by way of example, with reference to the accompanying drawings, in which.

DETAILED DESCRIPTION OF THE PREFERRED EMBODIMENTS

Figure 1:
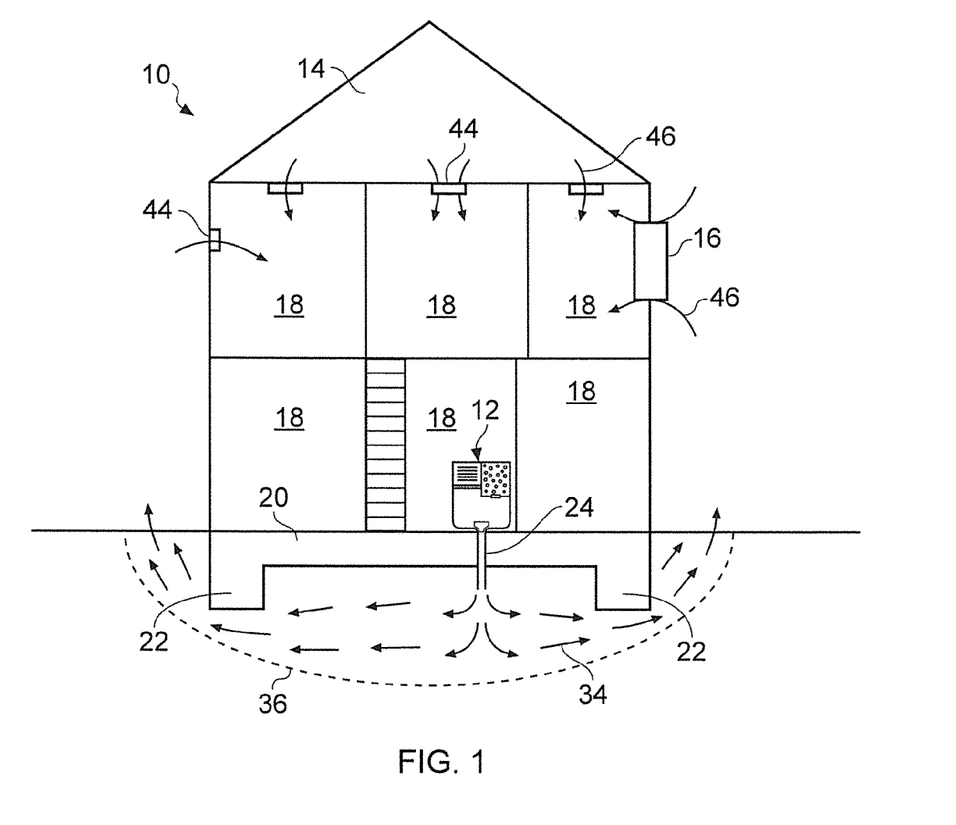
FIG. 1 is a cross section of a building to which an embodiment of the present invention has been applied.

Referring first to FIG. 1, there is shown a section of a building, generally indicated 10. The building 10 comprises a loft region 14, a window 16, habitable rooms 18, a foundation layer 20, footings 22, a pump unit 12, and diffusion means (here depicted as a conduit 24). The pump unit 12 is located within a habitable room 18 and is shown in more detail in FIGS. 2a and 2b.

Figure 2A:
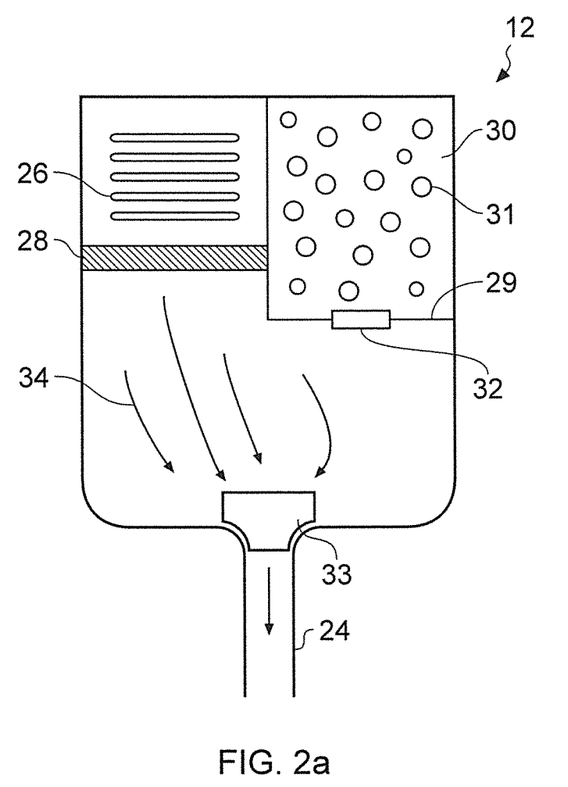
FIG. 2a is an enlarged view of the pump unit of FIG. 1 shown with the control valve in a closed position.

With reference to FIG. 2a, there is shown an enlarged view of the pump unit, generally indicated 12, of FIG. 1. The pump unit 12 has air intake openings 26, an air filter 28, a reservoir 30 of a chemical agent vapor 31 which comprises ozone in this example, and a control valve 32. Obviously, other types of closure valve may be employed in other embodiments. The pump unit 12 also has a prime mover 33 which, in use, draws air from within the habitable room 18 of the building 10 via the air intake openings 26. The pump unit 12 is provided with an air filter 28 to remove any dust particles or other impurities that may be contained within the air. Following this, the clean air moves in a direction indicated by the pump air stream arrows 34 towards the conduit 24, which is connected at the outlet of the pump unit 12. The control valve 32 is located within a wall 29 of the reservoir 30.

The amount of ozone 31 to be delivered to the region below the building 10 while the system is active can be varied by controlling the opening of the control valve 32. FIG. 2a illustrates the control valve 32 in a fully closed position, thereby preventing any ozone 31 from mixing with and being conveyed by the air stream 34. Consequently, in this configuration the pump air stream 34 will not contain ozone 31 and therefore only air will be delivered to the region below the building 10.

Figure 2B:
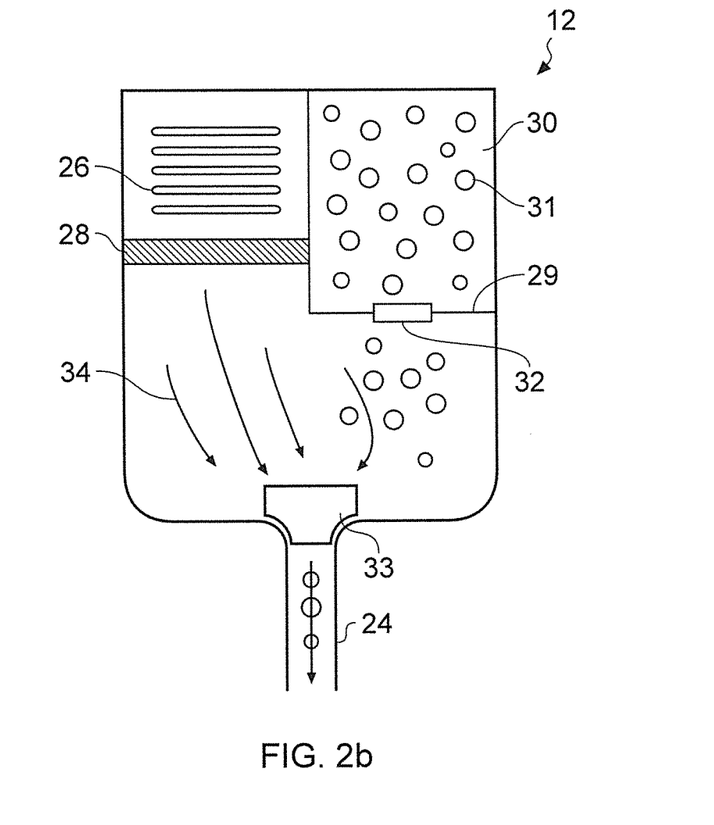
FIG. 2b is an enlarged view of the pump unit of FIG. 1 shown with the control valve in an open position.

FIG. 2b illustrates the pump unit 12 of FIG. 1, wherein the control valve 32 is in an open position. When in this configuration, the ozone 31 is free to mix with and be conveyed by the pump air stream 34 towards the adjoining conduit 24. In this way an air/ozone mix (hereinafter referred to as the gas mix) can be delivered to the region below the building 10. The amount of ozone 31 to be delivered to the region below the building 10 can therefore be varied by adjusting the control valve 32 between the closed and open configurations shown in FIGS. 2a and 2b, respectively.

Referring back to FIG. 1, the conduit 24 connects the outlet from the pump unit 12 into the region below the building 10. The conduit 24 passes through the foundation layer 20 to enable delivery of the gas mix to the region below the building 10. The gas mix diffuses into the region below the building 10 and moves through the ground in a direction indicated by the arrows 34. This movement is in a downward and lateral direction from the ground region between the footings 22 of the building 10, to an eventual upward direction towards and through the ground layer located on the extremities of the building 10. In this way, the gas mix will eventually diffuse into the external atmosphere. The gas mix is forced into the ground region under pressure by the pump unit 12, thereby creating an invisible barrier 36 which acts to inhibit the presence of and growth of termites in order to protect the building 10.

Figure 3:
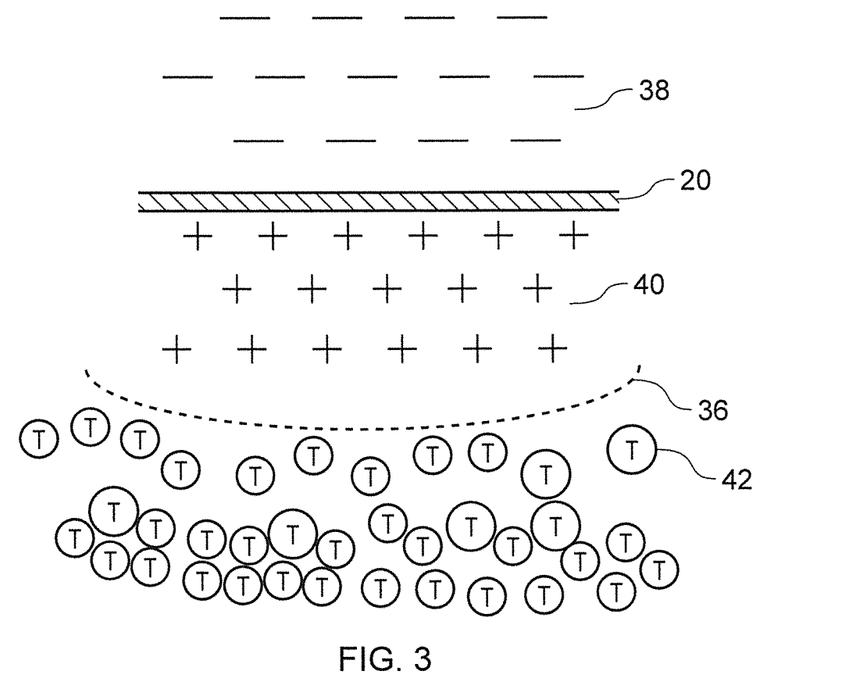
FIG. 3 is a section on an enlarged scale through the foundation layer of the building of FIG. 1.

With reference to FIG. 3, there is illustrated a representation of the respective regions above and below the foundation layer 20. The pump unit 12 pumps air from within the habitable rooms 18 of the building 10 into the ground region below the building 10. Accordingly, the relative pressures in these respective regions are indicated, in that the region above the foundation layer 20 has a sub-atmospheric pressure 38, whereas the region below the foundation layer 20 has a superatmospheric pressure 40. This relative pressure differential ensures that a positive pressure field is maintained in the ground region below the building 10 when the system is active, thereby maintaining a continuous flow of gas mix within this region. This pressure differential and airflow has the effect of removing moisture from this region by ventilation thereof and also acts to avoid still air. Consequently, unnatural subsoil conditions are generated thereby creating an invisible barrier in which termites 42, are discouraged from entering. Accordingly, the termites 42 vacate the region, leaving behind a pheromone which warns other termites against entering the protected region.

Referring back to FIG. 1, there is also illustrated a secondary function of the present invention. The building 10 is also provided with external air intake grilles 44, through which external air surrounding the building 10 is drawn into the building. The external air intake grilles 44 are located on both the exterior side wall of the building 10 and on the ceilings of the habitable rooms 18 adjacent to the loft 14. The secondary function of the present invention takes effect in conjunction with the primary function of the present invention, in that in use when internal air is drawn in by the pump unit 12 to be delivered to the region below the building 10, external air is simultaneously drawn in from the regions surrounding the building 10 and also the loft 14 of the building 10, the external air intake flow being indicated by arrows 46. This forced ventilation of the internal regions of the building 10 is caused by the sub-atmospheric pressure created by action of the pump unit 12. Accordingly, this induced pressure differential between the internal regions of the building 10 and the external regions of the building 10 causes external air to be drawn in via the external air intake grilles 44 and the peripheral regions of the window 16.

Figure 4:
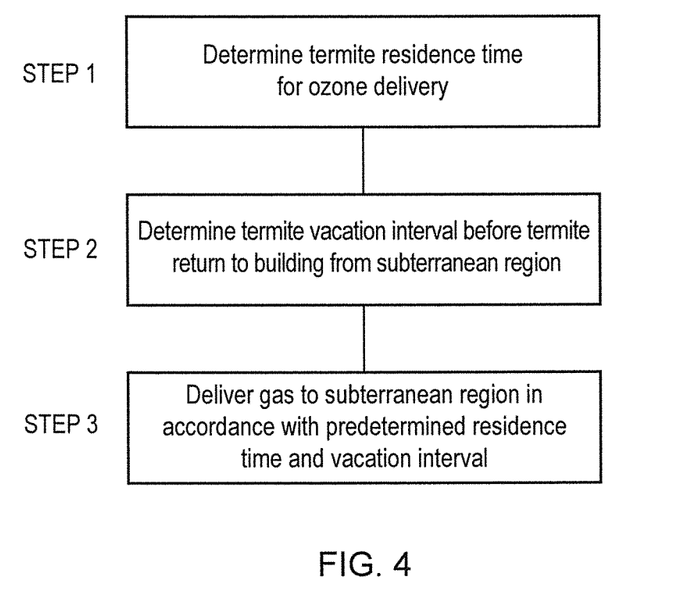
FIG. 4 is a flow chart showing the major steps in protecting a building from termites by the method of the present invention.

FIG. 4 is a flow chart showing the principal steps in protecting a building from termites. The first step comprises determination of the termite residence time period for delivery of ozone to inhibit the presence of the termites. This determination may be made by conducting field or laboratory testing in order to evaluate the effect of ozone on termites. At present, it is considered that ozone is the most suitable agent. The second step is the determination of the termite vacation interval before arrival of termites back at the building since plainly there is no incentive to infuse a building or the ground beneath it with a treatment agent if this is to be wasted. Although not essential to the invention, there may be sensors positioned in preset locations and able to monitor the progress of termites as they approach the building. The third step involves the use of a pump unit to deliver air/ozone mix to the region below the building, thereby creating a superatmospheric pressure in this region. The delivery of the gas mix will be made in accordance with the previously-determined residence time and vacation times of the termites. Because the delivery of the gas mix is made only when the termites are (or are assumed to be) present in the building then the amount of gas mix used is minimized, but more importantly, the termites themselves emit a pheromone as they leave the building, which acts as a warning to other colonies of termites as they approach, thus serving to keep them away from the building. Eventually the effect of this pheromone will fade, at which point termites will again start to colonize the building. If provided, such sensors act to detect when this has occurred and to recommence infusion of the treatment agent. If the cycle time has been established in advance, the sensors will not be needed and the periodic infusion of treatment agent can be made indefinitely thereby protecting the building from attack.

Figure 5:
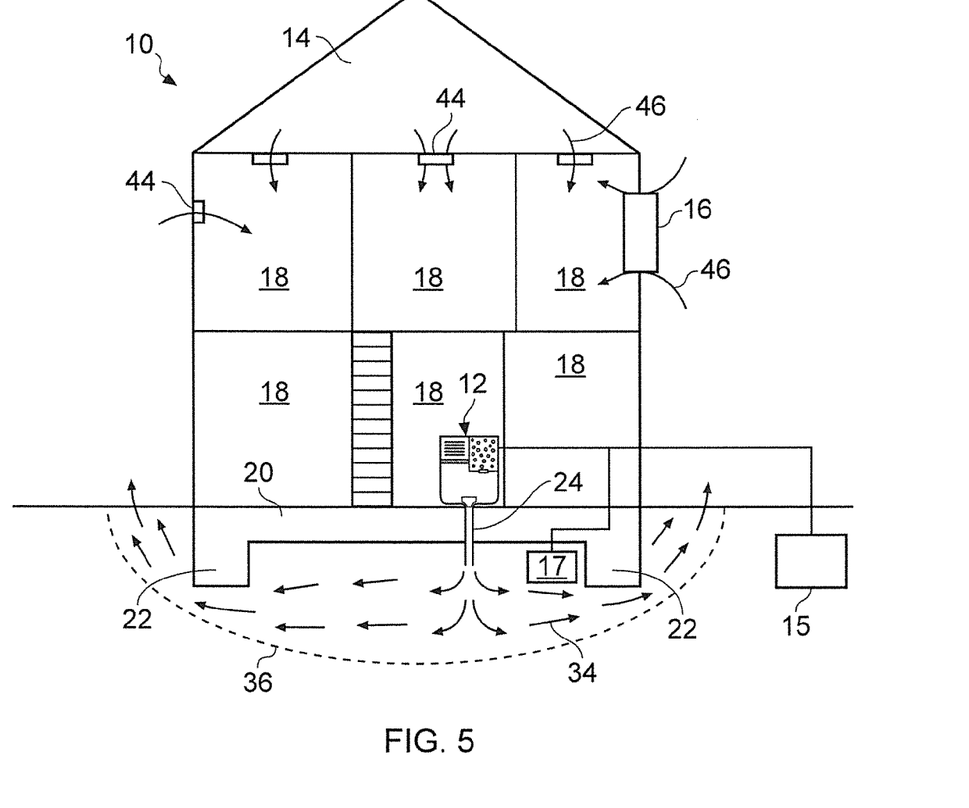
FIG. 5 is a cross section of a building equipped with an alternative embodiment of the invention.

In the alternative embodiment, illustrated in FIG. 5, sensors 15, 17 detect the presence of termites to trigger the operation of the pump to deliver ozone for the termite residence time and the termite vacation time.

Other embodiments (not illustrated) do not rely on sensing the presence or absence of termites but may be set to cycle through different phases of infusion and discontinuance based on estimations or experience with similar buildings and the likely behavior of termites.

Figure 6:
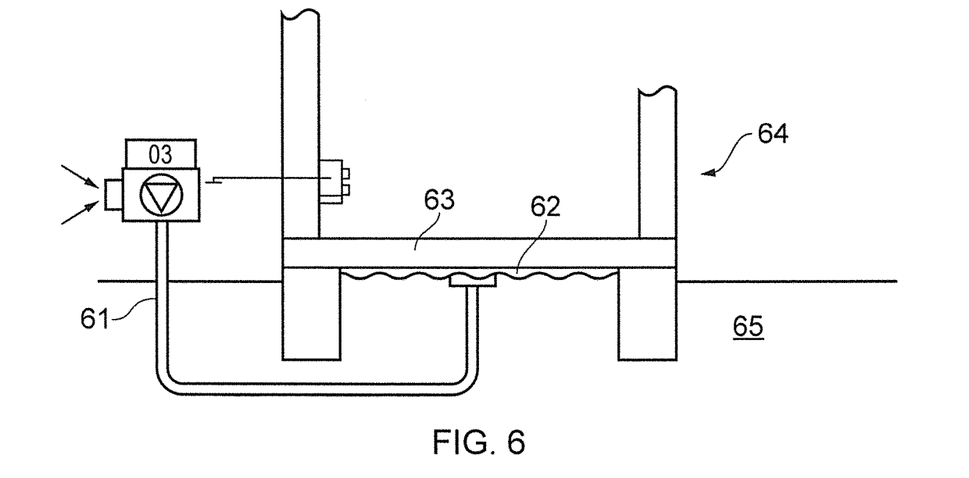
FIG. 6 is a partial sectional view of the lower part of a building with an alternative embodiment of the invention installed therein.
Figure 7:
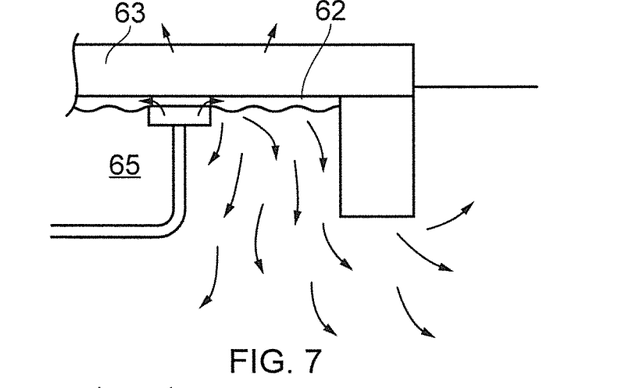
FIG. 7 is an enlarged view of part of FIG. 6 showing the interspace between the ground and the underside of a floor slab in more detail.
Figure 8:
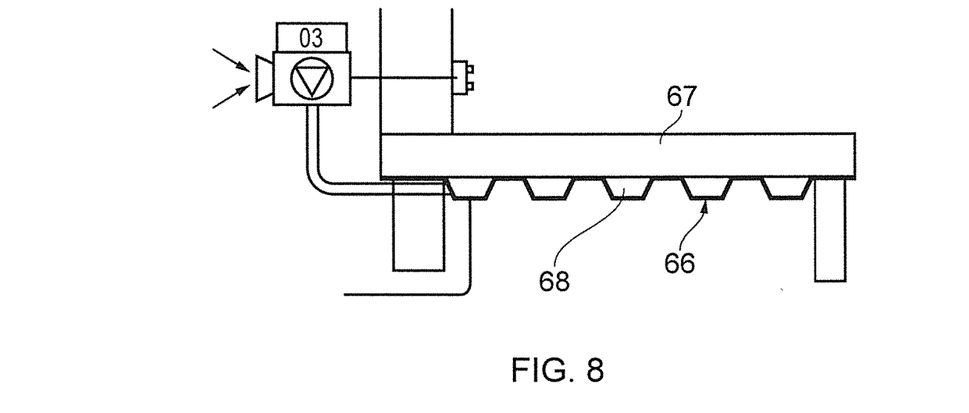
FIG. 8 is a partial sectional view of a building incorporating a further embodiment of the invention.

FIG. 6 shows an alternative embodiment in which the infusion pathway, in this case a duct 61, leads to an interspace 62 between the floor slab 63 of the building 64 and the ground 65, in which case the ozone infuses downwardly into the ground 65 from the interspace 62. Such embodiments are useful as retro-fitted equipment in buildings where the floor slab is laid on the ground, possibly over a damp-proof membrane (not shown) without any specific structure or arrangement to separate the two. In use, the ozone/air mixture is delivered along the duct 61 to a central region of the underside of the floor slab from which it permeates the ground beneath the building as represented by the arrows A in FIG. 7. Similarly, in the case of new buildings, it is possible to position a void former 66 under the floor slab 67 as shown in FIG. 8 to create a suitable void space 68 for injecting ozone, or to so construct the building that a suitable void space is formed, into which ozone can be injected and allowed to diffuse upwardly into the building and downwardly into the ground.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. A method of protecting a building from damage, by termites, comprising the steps of:—
    (a) detecting the presence of termites within the building or a close vicinity thereof;
    (b) infusing a protected region of ground below the building with ozone by delivering ozone into said protected region to create a superatmospheric pressure field below the building, the delivery at a determined concentration which is less than that at which its presence would cause detrimental effects on humans occupying the building, and sufficient to cause the termites to vacate the protected region,
    (c) discontinuing delivery of ozone upon departure of the termites, thereafter maintaining ozone delivery turned off and allowing termites to return to the protected region,
    (d) recommencing delivery of ozone at said determined concentration after the termites have returned to the protected region and continuing delivery until the termites again vacate said protected region,
    (e) repeating said discontinuing and delivering steps for as long as the termites return into said protected region wherein the ozone concentration is varied below said safety threshold level thereof whereby to avoid habituation of said termites to its presence.

2. A method as claimed in claim 1, wherein the ozone is delivered at a rate such as to create a superatmospheric pressure field in said protected ground region below the building.

3. A method as claimed in claim 1, wherein the ozone concentration is varied below the safe level thereof whereby the avoid habituation of said termites to its presence.

4. A method as claimed in claim 1, wherein a termite residence time during which the termites remain in the building after the commencement of ozone delivery and before they vacate the building, is determined in advance by tests on said building or a comparable building.

5. A method as claimed in claim 1, wherein a termite residence time during which the termites remain in the building after the commencement of ozone delivery and before they vacate the building, is determined in advance by tests in a controlled environment.

6. A method as claimed in claim 1, wherein a termite vacation interval during which the termites remain away from the building before returning thereto is determined in advance by tests on said building or a comparable building.

7. A method as claimed in claim 1, wherein a termite vacation interval during which termites remain away from the building before returning thereto is determined in advance by tests on a controlled environment.

8. A method of protecting a building from damage by termites as claimed in claim 1, including the steps of:
   (e) monitoring the protected region to detect the return of termites thereto, and determining the time elapsed since delivery of ozone was discontinued;
   (f) after said step of determining the time elapsed, recommencing delivery of ozone at said determined concentration until the termites again vacate said protected region, and;
   (g) repeating the periodic delivery of ozone at intervals and for time periods determined by said detection of the presence and absence of the termites.

9. A method as claimed in claim 8, wherein the steps of determining the vacation interval, being the elapsed time between departure of the termites and the return thereof, and the residence time, being the time between the commencement of ozone delivery and departure of the termites, are repeated for several iterations to determine an average value for said vacation interval and said residence time whereby to determine the points in time for commencement and cessation of ozone delivery to said protected region.

10. A method of protecting a building from damage by termites comprising the steps of:
   preparing an introduction pathway for delivering ozone to a region below the building;
   determining, from physical parameters of the building:
   (a) a maximum safe delivery rate at which ozone can be delivered through said introduction pathway while maintaining a concentration of ozone below a safety threshold level in habitable parts of the building such as to allow continuous uninterrupted occupation by humans;
   (b) an infusion duration period for which infusion at said maximum safe delivery rate will achieve a substantially complete saturation of said region for a time sufficient to affect behavior of any termites present in said region;
   (c) a deterrence period during which termites will be deterred from re-entry into said region by residual pheromones secreted by departing termites;
   introducing ozone at a rate not greater than said determined maximum safe delivery rate into said introduction pathway to create a superatmospheric pressure field in the region below the building for said determined infusion duration period, thereafter discontinuing introduction of ozone for a discontinuance period not less than said deterrence period that has been determined;
   recommencing introduction of ozone at a rate not greater than said determined maximum safe delivery rate for a further said infusion duration period, and
   repeatedly cycling periods of infusion and discontinuance, wherein the ozone concentration is varied below said safety threshold level thereof whereby to avoid habituation of said termites to its presence.

11. A method as claimed in claim 10, in which said determination of said maximum safe delivery rate, and/or said infusion duration period, and/or said deterrence period is or are made as estimates on the basis of experience.

12. A method as claimed in claim 10, wherein a termite residence time that is a period during which the termites remain in the building after a commencement of ozone delivery and before they vacate the building, and on the basis of which the infusion duration period is established is determined in advance by tests on said building or a comparable building.

13. A method as claimed in claim 10, wherein a termite residence time, during which the termites remain in the building after a commencement of ozone delivery and before they vacate the building, and on the basis of which the infusion duration period is established, is determined in advance by tests in a controlled environment.

14. A method as claimed in claim 10, wherein a termite deterrence period during which termites remain away from the building before returning thereto is determined in advance by tests on said building or a comparable building.

15. A method as claimed in claim 10, wherein a termite deterrence period, during which termites remain away from the building before returning thereto is determined in advance by tests on a controlled environment.

16. A method as claimed in claim 10, in which said introduction pathway leads to or includes an interspace between a floor slab of the building and underlying ground.

17. A method as claimed in claim 10, in which said introduction pathway leads to or includes a void space beneath the building determined by the presence of a void former installed during constructions of the building.

18. A method as claimed in claim 10, in which said region below the building is a subterranean ground region.

19. A method of protecting a building from damage by termites, comprising the steps of:
   (a) establishing a presence of termites or termite activity within the building or within a vicinity thereof,
   (b) preparing an introduction pathway for delivering ozone to a region below the building,
   (c) infusing said region with ozone by delivering ozone through said introduction pathway into said region to create a superatmospheric pressure field below the building but at a rate and at a concentration which results in an ozone concentration in habitable parts of the building which is less than that at which its presence would cause harmful effects on humans occupying said habitable parts of the building and sufficient to cause the termites to vacate the building,
   (d) continuing said ozone delivery for a period greater than that likely to result in substantially complete vacation of the building and said region by termites,
   (e) thereafter discontinuing said ozone delivery for a time period greater than that likely to be taken by termites to reinfest said building, and
   (f) recommencing said delivery of ozone into said introduction pathway and repeating said infusion and discontinuance steps wherein the ozone concentration is varied below a safety threshold level thereof whereby to avoid habituation of said termites to its presence.

20. A method as claimed in claim 19, in which said infusion and discontinuance steps are repeated indefinitely.

21. A method as claimed in claim 19, wherein the ozone is delivered at a rate such as to create a superatmospheric pressure field in said region below the building.

22. A method as claimed in claim 19, wherein the ozone concentration is varied below said safety threshold level thereof whereby to avoid habituation of said termites to its presence.

23. A method as claimed in claim 19, wherein a termite residence time during which the termites remain in the building after the commencement of ozone delivery and before they vacate the building and on the basis of which the infusion duration period is established, is determined in advance by tests on said building or a comparable building.

24. A method as claimed in claim 19, wherein a termite residence time during which the termites remain in the building after the commencement of ozone delivery and before they vacate the building and on the basis of which the infusion duration period is established, is determined in advance by tests in a controlled environment.

25. A method as claimed in claim 19, wherein a likely termite deterrence period, during which termites are likely to remain away from the building before returning thereto is determined in advance by tests on said building or a comparable building.

26. A method as claimed in claim 19, wherein a likely termite deterrence period, during which termites are likely to remain away from the building before returning thereto is determined in advance by tests of a controlled environment.

\* \* \* \* \*